Patented Nov. 9, 1943

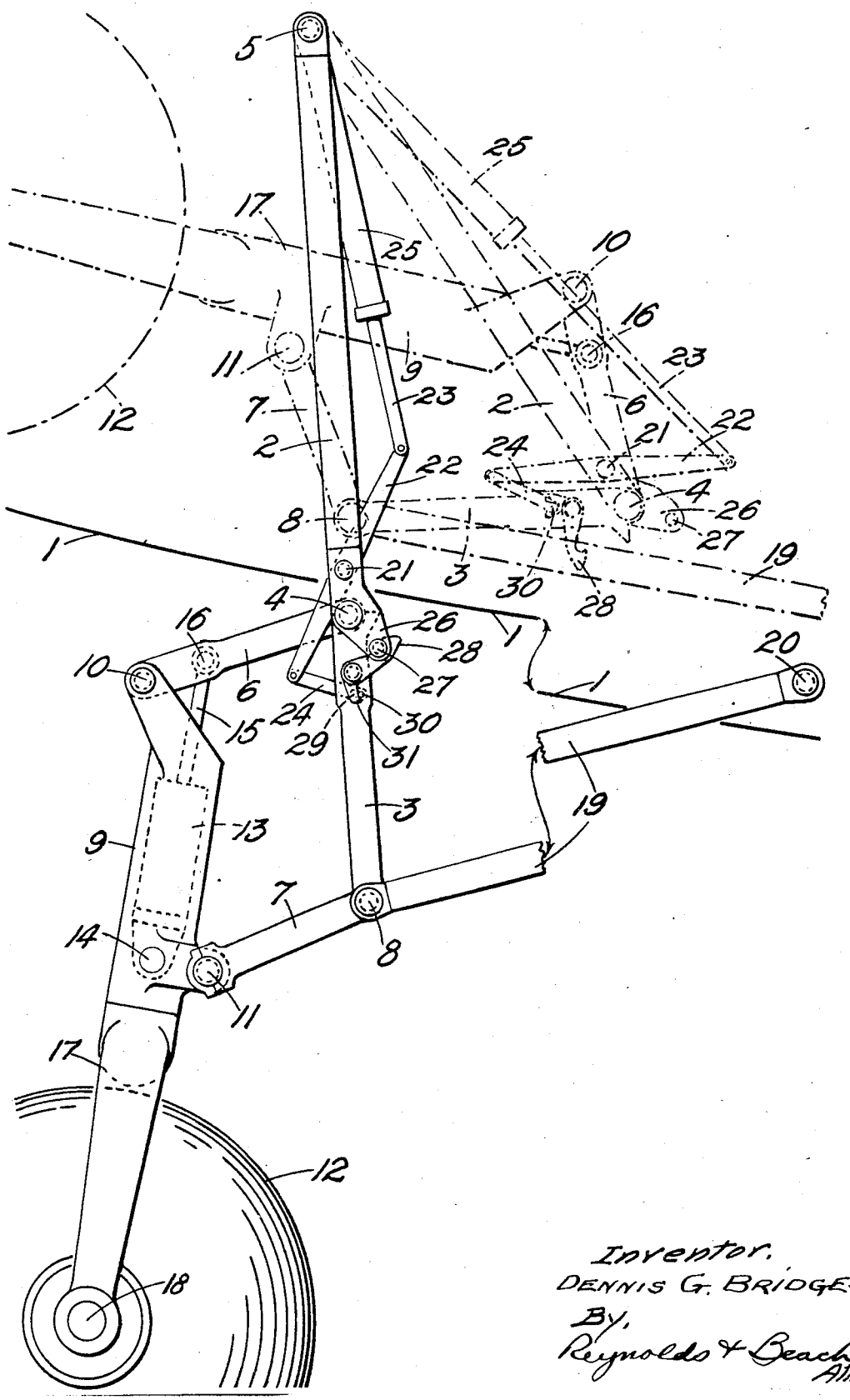

2,333,981

UNITED STATES PATENT OFFICE 2,333,981

RETRACTABLE LANDING GEAR FOR AIRCRAFT

Dennis Gilbert Bridges, Cheltenham, England, assignor to Dowty Equipment Limited, Cheltenham, England Application August 14, 1940, Serial No. 352,606
In Great Britain August 22, 1939

17 Claims. (Cl. 244—102)

This invention relates to retractable alighting gear for aircraft, and is applicable to nose-wheels, tail-wheels, main undercarriage gear and to alighting gear in which landing elements other than wheels are employed.

An object of the invention is to provide an arrangement of retractable alighting gear which is adapted to retract into limited space or where structural parts of the aircraft require that the landing element and outermost or lowermost parts of the gear move in retraction upwardly without substantial fore-and-aft or lateral movement.

A further object of the invention is to provide in retractable alighting gear a strong and robust framework which is rigid when extended and which supports the resiliently deformable framework carrying the landing element.

Yet a further object of the invention is the provision in retractable alighting gear of a particularly convenient and efficient arrangement of bracing against drag loads, and this may be of particular applicability in the case of nose-wheel gear.

The invention consists in a component of aircraft alighting gear including landing element mounting means, such as a leg, connected by a resiliently deformable frame directly to a breakable strut.

It will be realised that such an arrangement provides a scheme of retraction which though useful generally is particularly suitable to afford a convenient scheme of retraction for an auxiliary landing element such as a nose- or tail-wheel, the breakable strut providing in itself and in known manner a retractable structure which may in some cases carry a remotely-controllable jack or like member by which breaking of the strut and consequent retraction is effected. The breakable strut also includes means for locking the strut parts in an end-to-end extended relationship, the lock preferably being actuated by initial lost-motion of the jack immediately prior to retraction.

It also follows that the retractable part of the structure is virtually separate and self-contained, and the resiliently-deformable frame carrying the landing element mounting can remain unaffected in the swinging which takes place in retraction. Likewise, the mounting itself is readily adapted for the inclusion of self-centering and steering devices which likewise are not interfered with in the process of retraction.

In order that it may be clearly understood and more readily carried into effect, the invention is hereinafter described with reference to the accompanying diagrammatic drawing, which in the full-line position shows in the extended condition a retractable nose-wheel component of aircraft alighting gear; whereas the broken lines indicate the relationship of the parts in the retracted condition.

In the drawing a nose portion of an aircraft fuselage or other stream-lined structure is indicated by the reference numeral 1. The retractable structure comprises a breakable strut composed of the parts 2 and 3, which are pivotally interconnected by the pivot 4. The strut part 2, which may be regarded as the upper strut part, has a pivot connection 5 to a suitable fixed part of the aircraft structure. The lower strut part 3 carries on the pivot 4 a rigid link 6, while in addition a rigid link 7 extends from the pivot 8. The rigid links 6 and 7 serve as substantially parallel links to mount the leg 9, which is carried by the pivots 10 and 11 respectively of the links 6 and 7. The links 6 and 7 together with the portion of the lower strut part 3 between the pivots 4 and 8, and that part of the leg between the pivots 10 and 11, provide a deformable quadrilateral frame, deformation of which resulting from landing and taxiing load applied to the leg 9 through the landing element 12 is resisted by a shock-absorber of which the cylindrical part 13, indicated in dotted lines, is enclosed within the leg 9, being mounted for limited angular swinging about the pin-joint 14. A plunger 15 extending axially of the cylinder 13 is pin-jointed to the link 6, as indicated at 16. The lower end of the leg 9 terminates in a fork 17 which supports the landing element spindle 18 bilaterally. A rigid radius rod 19 is pivotally connected between the pivot 8 on the leg and a fixed anchorage 20 on the aircraft structure, and thereby serves not only to brace the retractable structure in the extended condition, but also to guide it during retraction as the strut parts 2 and 3 jack-knife and fold in retraction, as will later be described.

To accomplish folding of the strut parts 2 and 3 to break the strut and effect retraction, there is mounted on the upper strut part 2 about the pivot 21 a lever 22 one end of which is connected to the jack plunger 23, whereas at the other end there is a link 24 pivotally connected at 30 to the lower strut part 3. The jack cylinder 25, from which the plunger 23 extends, is itself pivoted to the pivot 5, which serves also to mount the upper strut part 2.

Slightly offset from the lower end of the upper strut part 2 is a fork fitting 26 serving to mount a latch pin 27 engaged by the latch 28 for locking the strut parts 2 and 3 in their extended end-to-end relationship, the latch being operated for release by initial jack movement preparatory to operation of the jack for retraction. Initial lost-motion for jack operation is accommodated by the slot 29 provided in the lower strut part 3 for engagement by the peg 30 carried by the link 24, as a result of which initial movement of the link causes the peg 30 to engage the tail 31 to the latch 28 and release the lock, whereafter continued actuation of the jack breaks the strut, causing the parts 2 and 3 to fold into the broken-line position. The latch is returned to locking engagement with pin 27 by suitable spring means when the pressure of peg 30 against it is relieved upon strut parts 2 and 3 being again extended into alignment.

It will be realised that the general structure is capable of considerable variation; for instance the strut parts 2 and 3, as well as the links 6 and 7, leg 9 and radius rod 19, may be either single members or laterally-spaced elements appropriately braced. It is preferred that the rigid radius rod 19 shall comprise spaced members splayed somewhat outwards as they extend rearwardly whereby to afford some measure of resistance to lateral displacement.

The jack is preferably of the double-acting type, there being appropriate connections to the cylinder 25 at either end. The structure may be maintained in the retracted condition by pressure in the jack, or by a spring catch for example the latch 28 may engage an appropriate fixed member in the retracted condition.

What I claim is:

1. A component of aircraft alighting gear, comprising an upright strut, a landing leg offset from and generally parallel to said strut, having its upper end offset from the leg proper in a direction away from said upright strut, vertically spaced, parallel links interconnecting said strut and said landing leg, the upper one of said links being connected to the offset leg end, and a shock absorber received within and reacting from said leg, and pivotally connected to said upper link at a point substantially in alignment with the leg proper and between its connections with said leg and said strut.

2. Retractable aircraft alighting gear comprising a normally upright strut element, a ground-engaging member, means supporting said ground-engaging member from said strut element in a position at all times offset from said strut element transversely thereof, means swingably supporting said strut element from the aircraft structure, and retracting means connected to the upper portion of said normally upright strut element and operable to swing said strut element and said ground-engaging member conjointly to dispose said strut element in generally horizontal retracted position below both said retracting means and said ground-engaging member supporting means.

3. A retractable aircraft alighting gear comprising an upright landing leg having its upper end offset, an upright strut spaced from said landing leg, at the side opposite the latter's offset upper end, means adapted to support said strut from the aircraft structure, vertically spaced parallel links pivotally interconnecting the landing leg and the strut, the upper such link being pivoted to the leg's offset upper end, a shock absorber received within the landing leg and pivotally connected to said upper link at a point substantially in alignment with the leg proper, pivot means connecting said strut to the aircraft structure, and retracting means operable to swing said strut to dispose the portion thereof intermediate the link connections therewith substantially in horizontal position with said landing leg disposed well above such portion of said strut.

4. In a streamlined aircraft structure, including a lower skin, retractable alighting gear comprising a landing leg, a breakable upright strut including upper and lower parts pivotally connected end to end, pivot means disposed well above the lower skin of the aircraft structure connecting the upper part of said strut to the aircraft structure, means interconnecting said landing leg and said lower strut part in laterally offset relationship, and retracting means operable to break said strut about the pivot interconnection of its component parts by deflecting said pivotal connection laterally away from said landing leg, and to swing said lower strut part substantially into horizontal position immediately above the aircraft structure's lower skin with said landing leg disposed well above said lower strut part and the lower skin of the aircraft structure.

5. The retractable alighting gear of claim 4, wherein the retracting means includes a jack mounted adjacent to the upper end of the upper part of the breakable strut and connected to such strut.

6. The retractable alighting gear of claim 4, wherein the retracting means includes a jack pivotally mounted to swing about the axis of the pivot means connecting the upper part of the breakable strut to the aircraft structure, and connected to such strut.

7. The retractable alighting gear of claim 4, wherein the retracting means includes a jack pivotally mounted to swing about the axis of the pivot means connecting the upper part of the breakable strut to the aircraft structure, and a pivoted lever connected to said jack, carried by the upper part of the breakable strut, extending across the pivotal interconnection of the breakable strut parts, and connected to the lower part of the breakable strut.

8. Retractable aircraft alighting gear, comprising an upright landing leg, an upright breakable strut including upper and lower parts pivotally connected end to end, pivot means connecting the upper part of said strut to the aircraft structure, means interconnecting said landing leg and said lower strut part for relative longitudinal movement, and maintaining them at all times in such offset relationship, and retracting means operable to break said strut about the pivot interconnection of its component parts by deflecting such pivotal connection laterally away from said landing leg, and to swing said lower strut part substantially into horizontal position with said landing leg disposed well above said lower strut part.

9. Retractable aircraft alighting gear as in claim 8 wherein the landing leg is disposed in advance of the strut, so constructed and arranged that the means interconnecting the landing leg and the lower strut part is formed as a pair of parallel links, and the pivotal connection between the strut parts moves rearwardly in retraction, to dispose the landing leg above the retracted lower strut part.

10. Retractable aircraft alighting gear, comprising an upright breakable strut, including upper and lower parts pivotally connected end to end, pivot means connecting said upper strut part to the aircraft structure, an inclined strut having one end pivoted to the lower part of said upright strut and its other end pivoted to the aircraft structure, a ground engaging member, means supporting said ground engaging member from the lower part of said upright strut in an offset position on the side thereof opposite said inclined strut, and retracting means operable to break said upright strut about the pivot interconnection of its component parts, by deflecting such pivotal interconnection toward the pivot connection of said inclined strut with the aircraft structure, and to swing said inclined strut and the lower part of said upright strut upward into substantially horizontal positions with said ground engaging member above both the lower part of said upright strut and said inclined strut.

11. Retractable aircraft alighting gear as defined in claim 10, wherein the retracting means includes a pivoted lever carried by one of the upright strut parts, extending across the pivotal interconnection of such strut parts, and connected to the other strut part, and jack means pivotally connected to and reacting between said lever and the part of the upright breakable strut carrying said lever.

12. In a retractable aircraft alighting gear, two upright legs offset fore and aft from one another in their operative positions, a landing element carried by the forward such leg, linkage connecting the two legs to constitute a deformable frame, a shock absorber arranged to resiliently resist such deformation and thus to absorb landing and taxying loads, the rear leg being formed of an upper and a lower portion connected by a transverse pivot, arranged to jack-knife in retracting, but being substantially aligned when in operative position, the aforesaid linkage and the forward leg and shock absorber being carried wholly by said lower portion of the rear leg, a drag strut connected to said lower portion of the rear leg and adapted to be secured to the aircraft structure, to brace such leg portion, and to guide it during extension and retraction, and means to draw the rear leg's pivot rearwardly, to break the rear leg at the pivot for retraction, and to move said pivot forwardly to align said two portions for extension.

13. Retractable aircraft alighting gear comprising a normally upright landing leg, a normally upright strut element offset therefrom, means attached to the upper end of said strut element for supporting it swingably from the aircraft structure, and a normally inclined strut pivotally connected by one end to the upright strut element and extending thence away from the landing leg, and pivotally connected by its other end to the aircraft structure, the landing leg, the upright strut element and the inclined strut lying in a common plane, means supporting the landing leg, thus offset, from the upright strut element, and retracting means connected to said normally upright strut element, and operable to swing it and said inclined strut into generally horizontal retracted positions, with the landing leg above the upright strut element and the inclined strut.

14. Retractable aircraft alighting gear, comprising a normally upright strut, a normally inclined strut having one end pivoted to the lower portion of said upright strut and its other end pivoted to the aircraft structure, a support including a leg, a ground-engaging member carried by said leg, parallel links disposed one above the other, supporting said leg from the lower end of the upright strut, spaced from the latter and at the side thereof opposite said inclined strut, said support including shock absorbing means acting upon said parallel links to swing them downwardly relative to the upright strut and to resist upward swinging thereof under the influence of contact of the ground-engaging member with the ground, and retracting means operable to swing said inclined strut upward into substantially horizontal retracted position with said leg above it.

15. Retractable aircraft landing gear as in claim 14, wherein the ground-engaging member includes an upright landing leg, the upper end whereof is offset from the leg proper, away from the upright strut, and a shock absorber received within said landing leg and pivotally connected to the upper one of said parallel links at a point substantially in alignment with the leg proper, and between the link's connections with the leg and the strut, respectively.

16. Retractable aircraft alighting gear comprising a normally upright strut formed of two parts pivotally connected end to end, a pivot support for its upper end upon the aircraft structure, a ground-engaging member supported from and in offset relation to the lower strut part, a normally inclined strut pivotally connected by one end to said lower strut part, adjacent its lower end, and extending away from said ground-engaging member, said inclined strut being pivotally connected by its other end to the aircraft structure, retracting means including a lever pivoted upon the upright strut adjacent the latter's intermediate pivot, and operatively connected to the lower strut part, and jack means operatively connected to said lever, said retracting means being organized and arranged to break the upright strut towards the aircraft-connected end of the inclined strut.

17. Retractable aircraft alighting gear comprising a normally upright strut formed of two parts pivotally connected end to end, a pivot support for its upper end upon the aircraft structure, a ground-engaging member supported from and in offset relation to the lower strut part, a normally inclined strut pivotally connected by one end to said lower strut part, adjacent its lower end, and extending away from said ground-engaging member, said inclined strut being pivotally connected by its other end to the aircraft structure, retracting means including a lever pivoted upon the upright strut adjacent the latter's intermediate pivot, and operatively connected to the lower strut part, jack means operatively connected to said lever, said retracting means being organized and arranged to break the upright strut towards the air-craft-connected end of the inclined strut, a latch connecting the two parts of the upright strut, across their common pivot, to prevent their breaking, and lost-motion means included in the operative connection between the lever and the lower strut part, and operatively connected to the latch to release the same prior to breaking the upright strut.

DENNIS GILBERT BRIDGES.